(12) United States Patent
Hanson et al.

(10) Patent No.: US 9,362,724 B2
(45) Date of Patent: Jun. 7, 2016

(54) WIRE LOOM TOOL

(71) Applicants: Robert Bosch GmbH, Stuttgart (DE);
Service Solutions U.S. LLC, Warren, MI (US)

(72) Inventors: Jacob Hanson, Owatonna, MN (US);
Matthew Thompsen, Waseca, MN (US);
Gregory J. Fountain, Kalamazoo, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 417 days.

(21) Appl. No.: 13/756,411

(22) Filed: Jan. 31, 2013

(65) Prior Publication Data

US 2014/0182739 A1 Jul. 3, 2014

Related U.S. Application Data

(63) Continuation-in-part of application No. 13/731,389, filed on Dec. 31, 2012, now abandoned.

(51) Int. Cl.
*H02G 1/00* (2006.01)
*B21F 15/04* (2006.01)
*H01R 43/00* (2006.01)
*H01R 43/033* (2006.01)

(52) U.S. Cl.
CPC *H02G 1/00* (2013.01); *B21F 15/04* (2013.01); *H01R 43/00* (2013.01); *H01R 43/033* (2013.01); *Y10T 29/53943* (2015.01)

(58) Field of Classification Search
CPC ......... B21F 29/00; B21F 15/04; B25B 25/00; H01R 43/00; H01R 43/033; Y10T 29/53943; H02G 1/00
USPC .................................................. 140/123, 117
See application file for complete search history.

(56) References Cited

U.S. PATENT DOCUMENTS

| | | | | |
|---|---|---|---|---|
| 876,674 | A * | 1/1908 | Edward Young | 140/117 |
| 3,262,193 | A * | 7/1966 | Goldman Hans J et al. | 140/122 |
| 3,394,742 | A * | 7/1968 | John Zoltai | 7/107 |
| 3,756,522 | A * | 9/1973 | Ackerman | 242/439.3 |
| 2010/0095737 | A1 * | 4/2010 | Persson | 72/409.01 |

* cited by examiner

*Primary Examiner* — Teresa M Ekiert
(74) *Attorney, Agent, or Firm* — Baker Hostetler LLP

(57) ABSTRACT

A handheld device comprising a handle assembly containing a longitudinally tubular shank used to manage and/or insert flexible elongated components during the assembly, replacement and/or repair of wired elements of a system is described. The handheld device includes a conduit that can be used to manage and/or insert said flexible elongated components such as wires, cables, flexible tubing, lines, cords, strings, ropes, and the like through constrained spaces and/or barriers. The conduit may be partially opened or completely open to allow removing of the flexible elongated components from the handheld device.

17 Claims, 4 Drawing Sheets

WIRE LOOM TOOL

CROSS REFERENCE TO RELATED APPLICATIONS

The present application claims priority as a Continuation in Part Application to U.S. patent application Ser. No. 13/731,389 filed on Dec. 31, 2012 and entitled, "Wire Loom Tool" the contents of which are relied upon and incorporated herein by reference.

FIELD OF THE DISCLOSURE

The disclosure generally relates to a device used for managing and inserting flexible elongated components through constrained spaces during the assembly and/or repair of wired system elements. More particularly, a handheld device used for managing and inserting flexible elongated components including but not limited to wiring and/or flexible tubing, through constrained spaces, such as dividing walls and barriers.

BACKGROUND OF THE DISCLOSURE

A number of fields currently benefit from an array of wire handling and wire threading techniques. Different techniques are frequently employed by mechanics, technicians, engineers, and contractors depending on the application. In some applications, some techniques benefit from the use of one or more tools and/or parts in that they can facilitate threading and handling wires through constrained spaces, as it is often required, during the assembly and/or repair of wired system elements. Currently, the assembly and/or repair of wired system elements in many applications include assembling and/or removing wired elements, such as electrical parts, using existing handling and threading tools. Even though some tools are currently available, due in part to their design, handling and threading wires often results in very time consuming processes and/or unwanted results.

Generally, the design of existing tools is limited to a cylinder with a handle which can help a user guide a wire. However, in many instances these designs provide for many limitations which can create a difficult working environment and/or unwanted results in order to remove the tool after its use. For example, in the automotive industry after using the existing tools to assemble, replace, and/or repair a wired component, the mechanic or technician is often forced to cut fire wall lining and/or surrounding rubber seals to remove the tool after the wire has been guided through a compartment and/or a constrained space.

In addition, while working with wired components, the existing tool designs require that the user reach the end of the cylinder path to handle or work with the wire. Many times, by nature of the tools' use, the end of the cylinder used to thread the wire is on the other side of a dividing partition or barrier in a constrained space. Consequently, although the length of the cylinder that passes through may not appear long, due to space restrictions, it frequently increases the complexity of the job making it a more time consuming process.

As a result of the foregoing, there is a need for a new practical tool that can facilitate the management and/or inserting wires or tubes through dividing walls or barriers.

SUMMARY OF THE DISCLOSURE

Accordingly, the foregoing needs are met, to a great extent, by the present disclosure, wherein a handheld device useful to manage and/or insert flexible elongated components during the assembly, replacement and/or repair of wired elements of a system is described. In some aspects of the disclosure, the device can be used to manage and/or insert said flexible elongated components through constrained spaces. The flexible elongated components can include, for example, wires, cables, flexible tubing, lines, cords, strings, ropes, and the like.

In some embodiments, the handheld device for managing wires and providing a working clearance side in constrained spaces can include a handle assembly comprising a cylindrical like structure with a longitudinal channel with a first opening along the longitudinal channel and a shank with a second opening along its length contained therein. The longitudinal channel may be opened to allow disengaging the flexible elongated component(s) from the conduit along the longitudinal channel opening of the handheld device, or closed to contain the flexible elongated component(s). In addition, the longitudinally channel's first opening may be capable of providing working clearance to allow a user to have access to a side portion of at least a section along the length of a conduit formed by the inside of the handle assembly and the second opening along the length of the first longitudinally tubular shank.

In some aspects, the handle assembly's longitudinal trench channel can be partially or completely closed thereby containing one or more flexible elongated components and facilitating the guiding and inserting of the one or more flexible elongated component through a constrained space. Accordingly, the flexible elongated component may be guided to the contiguous longitudinally shank which can be used to manage and/or guide the flexible elongated component(s) while providing working clearance along at least a portion of the length of the longitudinally tubular shank. Subsequent to managing and inserting the flexible elongated components, the longitudinal trench channel of the handle assembly may be opened accordingly to remove the handheld device.

In some embodiments of the disclosure, the longitudinal trench channel of the handle assembly may be opened or closed, for example, by rotating motion of the handle assembly in relation to a second part of the handheld device. The second part of the handheld device may be the longitudinally tubular shank or any suitable part that could enclose at least one or more portion of the longitudinal trench channel of the handle assembly. In additional embodiments, the longitudinally tubular shank can include an additional one or more sections that would allow for a collapsible shank.

The handle assembly may be of any geometric form and size for a user to easily grip the handheld device, manipulate the shank portion, and provide a conduit for a flexible elongated component leading to the tubular shank portion. In some embodiments, the handle assembly may be made of or coated with a non-conductive composition to protect the user from being electrically shocked during repair due to damaged wires. The size of the handle assembly and the device can be proportional to the application and its needs.

There has thus been outlined, rather broadly, certain aspects of the disclosure in order that the detailed description herein may be better understood, and in order that the present contribution to the art may be better appreciated.

In this respect, before explaining at least one embodiment of the disclosure in detail, it is to be understood that the disclosure is not limited in its application to the details of the construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures for carrying out the several purposes of the present disclosure. It is important, therefore, that the claims be regarded as including such equivalent constructions insofar as they do not depart from the spirit and scope of the present disclosure.

DETAILED DESCRIPTION OF THE DISCLOSURE

Figure 1:
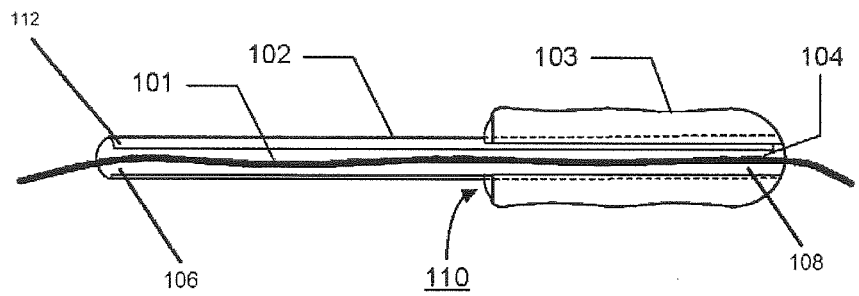
FIG. 1 is a side view illustration of an exemplary handheld device according to some aspects of the disclosure.

The disclosure will now be described with reference to the drawing figures. Throughout the description of the drawings, figures in which like reference numerals are used can refer to like parts throughout. However, any feature described in relation to any one aspect may be used alone, or in combination with other features described, and may also be used in combination with one or more aspects described or variations that will be readily apparent to those skilled in the art.

Referring now to FIG. 1, a side view illustration of an exemplary handheld device according to some aspects of the disclosure is depicted. The handheld device 110 includes handle assembly 103 with a conduit 104 or channel, which may be used to manage one or more flexible elongated component 101. A portion of the conduit 104 can be longitudinally exposed and contiguous to receive a shank 102 that can be longitudinally tubular having one or more bends 112 to conform to a restricted working space and having a longitudinal opening 106. The handle assembly 103 surrounds the conduit 104, but in one embodiment, not completely surrounding the conduit 104 (FIG. 2), thereby allowing a longitudinal opening 108. In another embodiment, the handle assembly 103 surrounds the entire conduit 104. The longitudinal opening is configured to receive the one or more flexible elongated component 101, such as wires, cables, flexible tubing, lines, cords, strings, ropes, and the like. As shown in FIG. 1, the longitudinal opening 108 in the conduit 104 and the longitudinal opening 106 are aligned opened with respect to each other and thus, allow the insertion or removal of the flexible elongated component 101.

The handle assembly 103 may be part of, or include, a handle of any geometric shape that allows a user to hold the handheld device 110 and can include the conduit 104 therein or in connection therewith to route and manage the flexible elongated component 101. In some embodiments, the handle assembly 103 may be of an ergonomic geometric shape that can provide for a comfortable grip to the user. For example, the handle assembly 103 having a generally cylindrical shape that conforms to the closed hand of a user or can be used just two or more fingers.

As shown in FIG. 1, the handle assembly 103 may be made from a polymer that under one condition (not gripped or gripped tightly closed) allows lateral access (along the handle assembly) to the conduit 104 and in a second condition (gripped closed) to deny lateral access to the conduit 104.

In some embodiments, the handle assembly 103 and/or the shank 102 may be a rigid structure of a non-conductive composition or a metal with a non-conductive coating to prevent electrical shock of the user when the handheld device 110 comes into contact with a damaged wire. Rigid and non-conductive materials can include polymers, ceramic compositions, or the like. Suitable polymers include but are not limited to rigid plastics, rubbers, acrylics, nylons, polystyrenes, polyvinylchlorides, polycarbonates, polyurethanes, polyethylenes, polypropylenes, polyamides, polyethers, polyesters, polyolefins, polyacrylates, polyisoprenes, fluoropolymers, combinations thereof or the like. In some additional embodiments, the handle assembly 103 may also include a sponge like or heat and/or electrically insulating foam material covering a rigid portion of the handle assembly 103 that can provide additional comfort.

Figure 2:
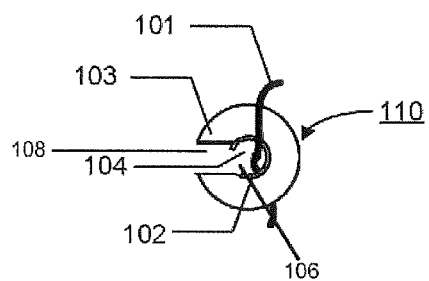
FIG. 2 is a top view illustration of the exemplary handheld device of FIG. 1 according to some aspects of the disclosure.

Referring now to FIG. 2, a top view illustration of the handheld device 110 of FIG. 1 according to some aspects of the disclosure is depicted. The shank 102 is depicted being contained within the conduit 104 of the handle assembly 103. In some embodiments, the handle assembly 103 may be capable of holding the shank 102, when gripped, so that it does not come out of the handle assembly 103 but that the shank 102 can still rotate within the handle assembly 103 to thereby open or close the conduit 104 to release or contain, respectively, the one or more flexible elongated component 101. The shank 102 may be held by a holding feature (not shown) contained thereon and mating with a holding feature (not shown) of the handle assembly 103 including, for example, coupling a radial protrusion to a depression on their adjacent surfaces. In another embodiment, the shank 102 is frictionally held in the handle assembly 103.

Figure 3:
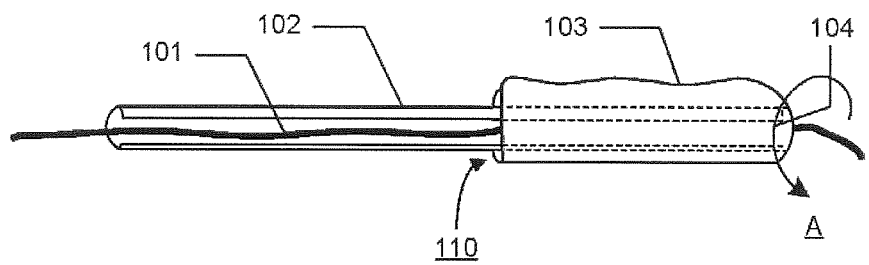
FIG. 3 is a side view illustration of the exemplary handheld device of FIG. 1 according to some aspects of the disclosure.

Referring now to FIG. 3, a side view illustration of the handheld device 110 of FIG. 1 according to some aspects of the disclosure is depicted. In particular, the handheld device 110 with the conduit 104, in the handle assembly 103, for one or more flexible elongated component 101 being closed for lateral access. That is the conduit's 104 opening and the longitudinal opening are not aligned in relation to each other. The conduit 104 that received the one or more flexible elongated component 101 can generally be enclosed radially by inner surfaces of the handle assembly 103 and the shank 102. In some embodiments, the handle assembly 103 along with the shank 102 can close the conduit's 104 opening radially by rotating in relation to each other in either direction. However, some embodiments can include two state or multiple state locking features that would allow for predetermined rotational positioning and/or unidirectional rotation functionality. For example, one embodiment may include features that would enable the opening by clockwise or counter clockwise (shown) rotational motion only and for one part to stop rotating in relation to the other absent additional force or moving an actuating feature (not shown) of the handheld device 110.

Figure 4:
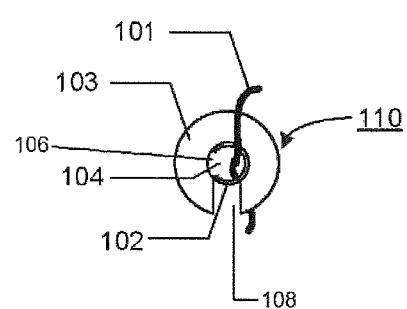
FIG. 4 is a top view illustration of the exemplary handheld device of FIG. 1 according to some aspects of the disclosure.

Referring now to FIG. 4, a top view illustration of the exemplary handheld device 110 of FIG. 1 according to some aspects of the disclosure is depicted. In particular, the handheld device 110 shows the angular radii of the shank 102 may be greater than the opening provided by the conduit's 104 longitudinal trench channel of the handle assembly 103 so that the shank 102 can be contained within therein.

Generally, the size of the trench channel of the handle assembly 103 may be designed to be proportional to the size of the handheld device 110 and in relation to the number and size of the flexible elongated component 101 that frequently need to be managed and/or inserted in particular applications.

Figure 5:
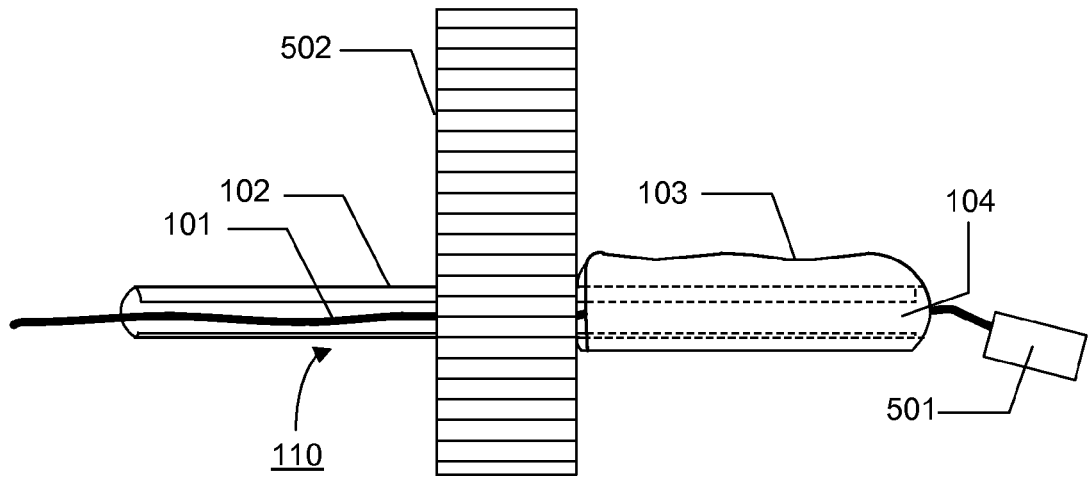
FIG. 5 is a side view representation of another exemplary handheld device going through a dividing partition wall according to aspects of the present disclosure.

Referring now to FIG. 5, a side view representation of another exemplary handheld device 110 going through a wall 502 partition or barrier according to aspects of the present disclosure is depicted. In particular, the handheld device 110 with the closed conduit 104 containing and guiding the flexible elongated component 101 through a constrained space or wall 502. Accordingly, the flexible elongated component 101 may be guided and pass through the wall 502 without getting tangled with surrounding objects.

Subsequent to passing the inserted end of the flexible elongated component 101 to the other side of the wall 502, the inserted end of the flexible elongated component 101 can be further managed by the shank 102. For example, the managing may include routing the flexible elongated component 101 through obstacles while keeping it sufficiently contained within the handheld device 110 to prevent it from falling out. At the same, the shank 102 may provide a working side along the partition so that the user does not need to reach to the end of the handheld device 110 to get to the inserted end of the flexible elongated component 101.

Moreover, using aspects of the handheld device 110 of the present disclosure, the handheld device 110 may be removed from the flexible elongated component 101 even while the flexible elongated component 101 is connected to a part 501 and without significantly disrupting neighboring parts. This may be achieved by opening the conduit 104 (aligning the longitudinal opening 105 with the conduit's opening) in the handle assembly 103 to thereby allow quick removal of the handheld device 110 from the flexible elongated component 101 without having to remove the part 501 connected thereto since a lateral opening is now open along the length of the handheld device 110. This becomes very useful in many applications including, for example, in the automotive industry where a brake line is passed through a wall 502 and is attached to a brake component according to manufacturing standards.

Figure 6:
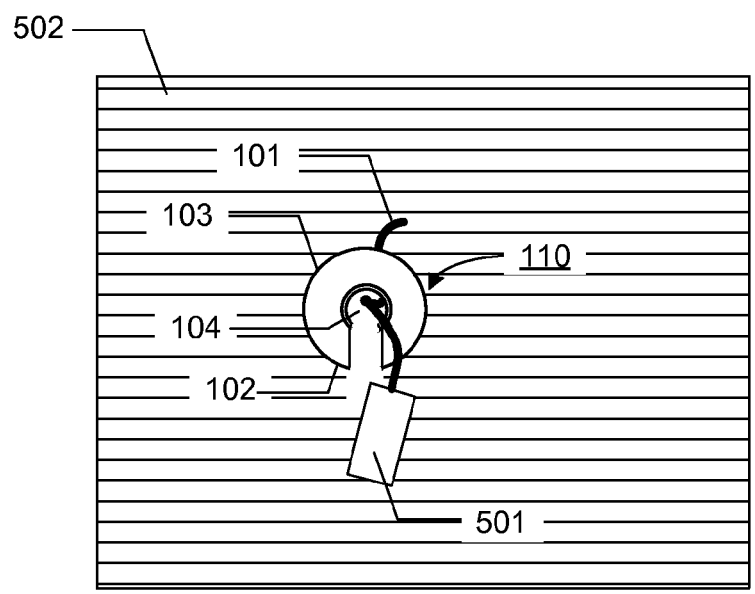
FIG. 6 is a top view representation of the exemplary handheld device of FIG. 5 going through a dividing partition wall according to aspects of the present disclosure.

Referring now to FIG. 6, a top view representation of the handheld device 110 of FIG. 5 going through a dividing partition wall 502 according to aspects of the present disclosure. In particular, shown is the exemplary handheld device 110 after opening the conduit 104 portion of the handle assembly 103. The opening of the conduit 104 portion of the handle assembly 103 may occur, for example, in any one manner or a combination thereof previously described herein. Subsequent to opening the conduit 104, it is evident from the illustration how the part 501 secured to the flexible elongated component 101 may no longer prevent the handheld device 110 from sliding out of the flexible elongated component 101. That is the flexible elongated component 101 may be disengaged from the handheld device 110.

Figure 7:
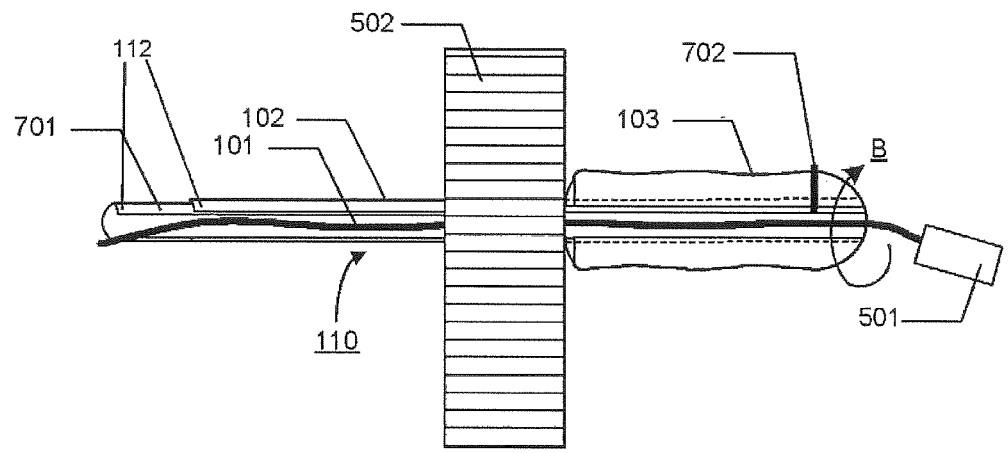
FIG. 7 is a side view representation of yet another exemplary handheld device going through a dividing partition wall according to aspects of the present disclosure.
Figure 8:
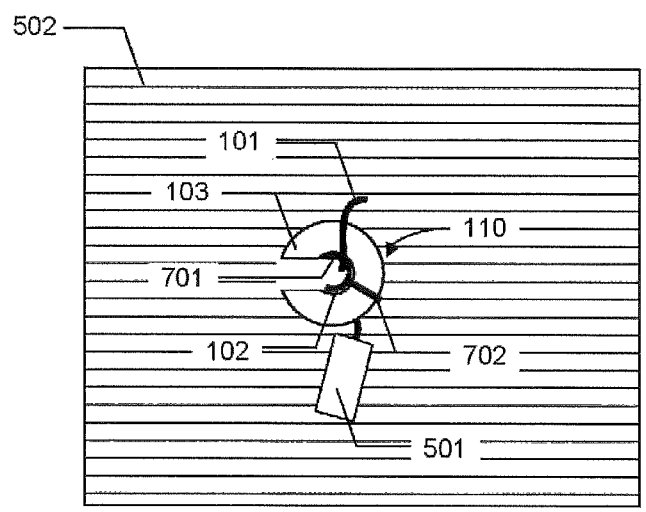
FIG. 8 is a top view representation of the exemplary handheld device of FIG. 7 going through a dividing partition wall according to aspects of the present disclosure.

Referring now to FIG. 7 and FIG. 8, a side and top view representations respectively of yet another exemplary handheld device going through a dividing partition wall 502 according to aspects of the present disclosure are illustrated. In particular, a supplementary shank 701 being incorporated into the handheld device 110. The supplementary shank 701, which may slide along the shank 102 to lengthen or shorten the length of the handheld tool 110. This feature can provide for a collapsible tool device for storage or useful in some fields.

The supplementary shank 701 may be held and contained within the shank 102. In addition in some embodiments, the supplementary shank 701 within the shank 102 may be controlled through a mechanical feature 702 that is designed to cause supplementary shank 701 to move in/out of the handle assembly 103 to lengthen/shorten the length of the body of the handheld device accordingly. For example, the mechanical feature 702 may include a lever which can control or cause the portion of the supplementary shank 701 to slide along the length of the shank 102. In some embodiments, the mechanical feature 702 may also be moved along a path along the length of the handle assembly 103. In other embodiments, more than one supplementary shank 701 may be included accordingly to provide the desired length in a particular application and/or compactability desired. In another embodiment, the supplementary shank 701 can be telescopic in nature.

It is to be understood that any feature described in relation to any one aspect may be used alone, or in combination with other features described, and may also be used in combination with one or more features of any other of the disclosed aspects, or any combination of any other of the disclosed aspects.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A handheld device for managing a wire and providing a working clearance side in constrained spaces, the handheld device comprising:
 a handle assembly having a longitudinal channel that includes a first opening along an entire length of the longitudinal channel; and
 a longitudinally tubular shank capable of providing working clearance and is received within the handle assembly, wherein the longitudinally tubular shank is rotatable about the handle assembly and includes a second opening along an entire length of the longitudinally tubular shank configured to receive the wire, wherein when the first opening along the entire length of the longitudinal channel and the second opening along the entire length of the longitudinally tubular shank are not aligned with each other, the wire is contained within the handheld device, and wherein when the first opening along the entire length of the longitudinal channel and the second opening along the entire length of the longitudinally tubular shank are aligned with each other, the wire is removable or insertable within the handheld device; and further comprising a supplementary longitudinally tubular shank held and at least partially contained by the longitudinally tubular shank.

2. The handheld device of claim 1, wherein the longitudinally tubular shank is frictionally secured in the handle assembly.

3. The handheld device of claim 1, wherein the supplementary longitudinally tubular shank slides along a length of the longitudinally tubular shank.

4. The handheld device of claim 3, further comprising a mechanical feature on the handle assembly configured to slide the supplementary longitudinally tubular shank.

5. The handheld device of claim 1, wherein the handle assembly comprises a non-conductive material or coating.

6. The handheld device of claim 1, wherein the handle assembly comprises a foam material that acts as an insulator and provides handling comfort to a user.

7. The handheld device of claim 1, wherein the longitudinally tubular shank includes a bend to conform to a restricted working space.

8. A handheld device for managing a wire and providing a working clearance side in constrained spaces, the handheld device comprising:
   a handle assembly having a longitudinal channel that includes a first opening along the length of the longitudinal channel;
   a first longitudinally tubular shank capable of providing working clearance and received by the handle assembly, wherein the first, longitudinally tubular shank is rotatable about the handle assembly and includes a second opening along the length configured to receive the wire;
   a second longitudinally tubular shank having a third opening along the length that is received within the first longitudinally tubular shank; and
   a mechanical feature configured to slide the second longitudinally tubular shank along the first longitudinally tubular shank, wherein the first and second longitudinally tubular shanks include a bend to conform to a restricted working space.

9. The handheld device of claim 8, wherein when the first opening along the length of the longitudinal channel and the second opening along the length of the first longitudinally tubular shank are aligned with each other, the wire is removable or insertable within the handheld device.

10. The handheld device of claim 8, wherein when the first opening along the length of the longitudinal channel and the second opening along the length of the first longitudinally tubular shank are not aligned with each other, the wire is contained within the handheld device.

11. The handheld device of claim 8, wherein the first and second longitudinally tubular shanks are frictionally secured in the handle assembly.

12. The handheld device of claim 8, wherein the handle assembly includes a non-conductive material or coating.

13. The handheld device of claim 8, wherein the first longitudinally tubular shank is made from a non-conductive material or coating.

14. The handheld device of claim 8, wherein the handle assembly includes a foam material that acts as an insulator and provides handling comfort to a user.

15. The handheld device of claim 8, wherein when the first opening along the length of the longitudinal channel, the second opening along the length of the first longitudinally tubular shank and the third opening along the length of the second longitudinally tubular shank are aligned with each other, the wire is removable or insertable within the handheld device.

16. The handheld device of claim 8, wherein the handle assembly is rotatable about the first and second longitudinally tubular shanks.

17. A handheld device for managing a wire and providing a working clearance side in constrained spaces, the handheld device comprising:
   a handle assembly having a longitudinal channel that includes a first opening along the length of the longitudinal channel;
   a first longitudinally tubular shank capable of providing working clearance and received by the handle assembly, wherein the first longitudinally tubular shank is rotatable about the handle assembly and includes a second opening along the length configured to receive the wire;
   a second longitudinally tubular shank having a third opening along the length that is received within the first longitudinally tubular shank; and
   a mechanical feature configured to slide the second longitudinally tubular shank along the first longitudinally tubular shank, wherein when the first opening along the length of the longitudinal channel and the second opening along the length of the first longitudinally tubular shank are not aligned with each other, the wire is contained within the handheld device.

* * * * *